(12) United States Patent
Okumura

(10) Patent No.: US 6,341,426 B1
(45) Date of Patent: Jan. 29, 2002

(54) ROTATION ANGLE SENSOR AND TORQUE SENSOR

(75) Inventor: Hirofumi Okumura, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 09/545,709

(22) Filed: Apr. 5, 2000

Related U.S. Application Data

(63) Continuation of application No. 09/227,054, filed on Jan. 7, 1999, now abandoned.

(30) Foreign Application Priority Data

Jan. 7, 1998 (JP) .......................................... 10-001567

(51) Int. Cl.⁷ .............................................. G01B 7/00
(52) U.S. Cl. ......................... 33/1 PT; 33/708; 33/1 N
(58) Field of Search ........................ 33/706, 707, 708, 33/762, 763, 1 PT, 1 N, 501.7, 501.13, 534; 73/862.333

(56) References Cited

U.S. PATENT DOCUMENTS

| | | | |
|---|---|---|---|
| 1,775,880 A | | 9/1930 | Whitlock |
| 2,878,566 A | * | 3/1959 | Mellen ........................ 33/1 N |
| 3,027,645 A | * | 4/1962 | Zieher ......................... 33/1 N |
| 4,449,191 A | * | 5/1984 | Mehnert ..................... 33/1 PT |
| 4,625,411 A | * | 12/1986 | Kahiwagi et al. ........... 33/1 PT |
| 4,660,288 A | * | 4/1987 | Dangschat .................. 33/1 PT |
| 5,218,769 A | * | 6/1993 | Tranchon ................... 33/1 PT |
| 5,243,188 A | | 9/1993 | Hattori et al. |
| 5,390,549 A | * | 2/1995 | Dobler et al. ........... 73/862.331 |
| 5,515,736 A | * | 5/1996 | Kawagoe etal. ....... 73/862.333 |
| 5,574,442 A | * | 11/1996 | Kinoshita et al. .......... 33/1 PT |
| 5,585,575 A | | 12/1996 | Sugihara et al. |
| 5,657,544 A | * | 8/1997 | Ota et al. ..................... 33/1 N |
| 5,708,216 A | * | 1/1998 | Garshelis et al. ....... 73/862.333 |
| 5,793,201 A | * | 8/1998 | Nelle et al. .................... 33/706 |
| 5,880,379 A | * | 3/1999 | Tanaka et al. ......... 73/862.333 |
| 5,930,905 A | * | 8/1999 | Zabler et al. ............... 33/1 PT |
| 6,182,370 B1 | * | 2/2001 | Baur et al. ................. 33/1 PT |

FOREIGN PATENT DOCUMENTS

| | | | |
|---|---|---|---|
| DE | 40 28 246 A1 | 3/1992 | |
| DE | 38 44 578 C2 | 4/1993 | |
| DE | 195 06 938 A1 | 8/1996 | |
| DE | 196 01 965 A1 | 7/1997 | |
| EP | 000151089 A2 * | 8/1985 | ............ 73/862.333 |
| JP | 153263 * | 9/1982 | ................ 33/1 PT |
| JP | 363317702 A * | 12/1988 | ............ 73/862.333 |
| JP | 403044528 A * | 2/1991 | ............ 73/862.333 |

* cited by examiner

*Primary Examiner*—Diego Gutierrez
*Assistant Examiner*—Madeline Gonzalez
(74) *Attorney, Agent, or Firm*—Brinks Hofer Gilson & Lione

(57) ABSTRACT

A rotation angle sensor wherein when code plates rotate as a result of rotation of rotary members, detecting elements detect information on information recording portions of the code plates in order to detect the rotation angles of the rotary members. Therefore, the rotation angles of the rotary members can be detected with high precision. In conventional rotation angle sensors, a rotary drum, being a magnetic medium, is mounted directly to a rotary shaft. Therefore, when two such conventional rotation angle sensors are mounted to a rotary shaft, and a rotational torque is applied to a drive shaft portion in order to rotate a load shaft portion, so that a large load is applied to the load shaft portion, the drive shaft portion and the load shaft portion may become decentered. This causes the gap between one of the two rotary drums and its associated detecting sensor as well as the gap between the other of the two rotary drums and its associated detecting sensor to vary, making it impossible to precisely detect the difference between the rotation angles of the two rotary drums. The rotation angle sensor of the invention overcomes this problem.

7 Claims, 7 Drawing Sheets

ROTATION ANGLE SENSOR AND TORQUE SENSOR

This application is a continuation of application Ser. No. 09/227,054 filed Jan. 7, 1999, abandoned.

BACKGROUND OF THE INVENTION

1. Field of the Invention

The present invention relates to a rotation angle sensor, a torque sensor incorporating the rotation angle sensor, and an electrically driven power steering apparatus using the torque sensor, and, more particularly, to a rotation angle sensor which can detect rotational angles with high precision, and apparatuses to which the rotation angle sensor is applied.

2. Description of the Related Art

FIG. 12 illustrates a conventional rotation angle sensor, wherein a rotary drum 2, having disk-shaped magnetic portions, is affixed to a rotary shaft 1. A magnetic code, consisting of a plurality of magnetic north-south (N-S) poles, is formed along the entire outer periphery of the rotary drum 2.

A magnetic detecting sensor 4 is provided so as to be spaced from the outer periphery of the magnetic drum 2 by a predetermined gap P that is disposed therebetween, whereby the conventional rotation angle sensor is formed.

Such a conventional rotation angle sensor is constructed such that when the magnetic drum 2 is rotated as a result of rotation of the rotary shaft 1, the magnetic sensor 4 detects analog changes, that is changes in the magnetic forces of the magnetic poles, in order to detect the angle of rotation of the magnetic drum 2.

A description will now be given of a conventional torque sensor, wherein two such rotation angle sensors described above are mounted to a rotary shaft 1 having a drive shaft portion 1a and a load shaft portion 1b illustrated in FIG. 13.

The drive shaft portion 1a and the load shaft portion 1b of the rotary shaft are connected together by a resilient member (not shown), being a torsion bar.

The two rotary drums 2 and 3 are affixed to the drive shaft portion 1a and the load shaft portion 1b, respectively. They are connected towards an end of the drive shaft portion 1a and an end of the load shaft portion 1b that is connected to the drive shaft portion 1a, and are separated by a distance L.

A pair of magnetic sensors 4 and 5 are provided such that the magnetic sensor 4 is separated from the outer periphery of the rotary drum 2 by a predetermined gap P1 and the magnetic sensor 5 is separated from the outer periphery of the rotary drum 3 by a predetermined gap P2.

In such an operating shaft 1, by applying a torque to the drive shaft portion 1a that is greater than the torque applied to the load shaft portion 1b, the drive shaft portion 1a and the load shaft portion 1b can be rotated.

When the rotary shaft 1 is rotated, the load shaft portion 1b starts to rotate slightly later than the drive shaft portion 1a, due to the resilient member.

A slightly delayed rotation of the load shaft portion 1b results in a difference between the rotational angle of the drive shaft portion 1a and that of the load shaft portion 1b. The difference in the rotational angles is proportional to the rotational torque on the drive shaft portion 1a, so that when the difference in the rotational angles is large, the rotational torque on the drive shaft portion 1a is large, whereas when the difference in the rotational angles is small, the rotational torque on the drive shaft portion 1a is small.

Such a conventional torque sensor can detect the rotational torque on the drive shaft portion 1a by computing the difference between the rotational angles of the drive shaft portion 1a and the load shaft portion 1b through an integrated circuit (IC), which is not shown.

However, in such a conventional rotation angle sensor and torque sensor, rotational drums, being magnetic media, are directly mounted to the rotary shaft 1, so that when a large load torque is applied to the load shaft portion 1b, the drive shaft portion 1a and the load shaft portion 1b may become decentered. When decentering occurs, the amount of gap P1 between the rotary drum 2 and the magnetic detecting sensor 4 and the amount of gap P2 between the rotary drum 3 and the magnetic detecting sensor 5 change, so that the magnetic detecting sensors 4 and 5 cannot detect the strength of the magnetic field between the two rotary drums 2 and 3 with precision. This makes it difficult to make precise detections of the difference between the rotational angles.

Therefore, when such a conventional torque sensor is used in an electrically driven power steering apparatus of, for example, an automobile, the shafts 1a and 1b must be formed precisely and made highly durable, in order for the power steering apparatus to provide highly reliable power steering properties.

SUMMARY OF THE INVENTION

Accordingly, it is an object of the present invention to make it possible to overcome the above-described problems in order to provide a high-precision angle sensor.

To this end, according to a first aspect of the present invention, there is provided a rotation angle sensor comprising a rotary member having a gear portion at the outer peripheral portion thereof, the rotary member having a shaft-inserting hole at the center of rotation thereof; a code plate which engages the gear portion of the rotary member, the code plate having an information recording portion which rotates in response to the rotation of the rotary member; and a detecting element for detecting information written on the information recording portion; wherein when the code plate rotates as a result of rotation of the rotary member, the detecting element detects the information on the code plate in order to detect the rotation angle of the rotary member.

Although not exclusive, in a preferred form of the invention, the rotary member may comprise a first rotary member portion and a second rotary member portion, the first rotary member portion and the second rotary member portion being separately rotatable and having the same center of rotation; the code plate may comprise a first code plate portion and a second code plate portion, each having a gear portion which engages the rotary member and being separately rotatable; and the detecting element may comprise a first detecting element portion and a second element portion for detecting information on the first code plate portion and the second code plate portion, respectively. In this structure, when the first rotary member portion and the second rotary member portion are rotated by engaging the gear portion of the first code plate portion with a gear portion of the first rotary member portion, and by engaging the gear portion of the second code plate portion with a gear portion of the second rotary member portion, the information on the first code plate portion is detected by the first detecting element portion, and the information on the second code plate portion is detected by the second detecting element portion, whereby the rotation angle of the first rotary member portion and the rotation angle of the second rotary member portion are separately detected.

Although not exclusive, in a preferred form of the invention, the first code plate portion and the second code plate portion may have the same center of rotation, with one side of the gear portion of the first code plate portion and one side of the gear portion of the second code plate portion being disposed such that they face each other, and the other side of the gear portion of the first code plate portion having formed thereat the information portion associated thereto and the other side of the gear portion of the second code plate portion having formed thereat the information recording portion associated thereto, the outside diameter of each information recording portion being larger than the outside diameter of the gear portion associated thereto. In addition, the first rotary member portion and the second rotary member portion may be rotatably interposed between the information recording portions.

Although not exclusive, in a preferred form of the invention, the rotary member, the code plate, and the detecting element may be accommodated in a box-shaped housing, and the code plate may be disposed between the detecting element and the rotary member.

Although not exclusive, in a preferred form of the invention, the information recording portion of the code plate may be composed of a magnetic material with a plurality of magnetic poles, and the detecting element may comprise a magnetic sensor which reacts with the magnetic field of the magnetic material.

According to a second aspect of the present invention, there is provided a torque sensor comprising a rotation angle sensor including a first rotary member and a second rotary member being separately rotatable and having the same center of rotation, each having a gear portion at the outer peripheral portion thereof and a shaft-inserting hole at the center of rotation thereof. In addition, the rotation angle sensor includes a first code plate and a second code plate being separately rotatable, the first code plate having a gear portion which engages the first rotary member and the second code plate having a gear portion which engages the second rotary member, the first code plate having an information recording portion which rotates in response to the rotation of the first rotary member and the second code plate having an information recording portion which rotates in response to the rotation of the second rotary member. Further, the rotation angle sensor includes a first detecting element for detecting information written on the first information recording portion, and a second detecting element for detecting information written on the second information recording portion. In the rotation angle sensor, when the first rotary member and the second rotary member rotate to rotate the first code plate and the second code plate, respectively, the first detecting element detects the information on the first code plate and the second detecting element detects the information on the second code plate, whereby the rotation angle of the first rotary member and the rotation angle of the second rotary member are detected. The torque sensor further comprises a first operating shaft and a second operating shaft, an end of the first operating shaft and an end of the second operating shaft being abutted against each other and connected by a resilient member, being a torsion bar. In the torque sensor, the first rotary member is supported by the end of the first operating shaft, and the second rotary member is supported by the end of the second operating shaft, in order to detect the rotation angle of the first operating shaft by the first detecting element and the rotation angle of the second operating shaft by the second detecting element, whereby the rotational torque on the first operating shaft is detected from the difference between the rotation angle of the first operating shaft and the rotation angle of the second operating shaft.

Although not exclusive, in a preferred form of the invention, a spring member may be provided at the inner peripheral surface of the edge of the shaft-inserting hole of the first rotary member and at the inner peripheral surface of the edge of the shaft-inserting hole of the second rotary member, the spring members resiliently pressing against the first and the second operating shafts in order to support the first rotary member by the first operating shaft and the second rotary member by the second operating shaft.

According to a third aspect of the present invention, there is provided an electrically driven power steering apparatus comprising a rotary angle sensor including a first rotary member and a second rotary member being separately rotatable and having the same center of rotation, each having a gear portion at the outer peripheral portion thereof and a shaft-inserting hole at the center of rotation thereof. In addition, the rotary angle sensor includes a first code plate and a second code plate being separately rotatable, the first code plate having a gear portion which engages the first rotary member and the second code plate having a gear portion which engages the second rotary member, the first code plate having an information recording portion which rotates in response to the rotation of the first rotary member and the second code plate having an information recording portion which rotates in response to the rotation of the second rotary member. Further, the rotation angle sensor includes a first detecting element for detecting information written on the first information recording portion, and a second detecting element for detecting information written on the second information recording portion. In the rotation angle sensor, when the first code plate and the second code plate are rotated as a result of rotation of the first rotary member and the second rotary member, respectively, the first detecting element detects the information on the first code plate and the second detecting element detects the information on the second code plate, whereby the rotation angle of the first rotary member and the rotation angle of the second rotary member are detected. The electrically driven power steering apparatus also comprises a vehicle handle side steering shaft for supporting the first rotary shaft, and a vehicle wheel side steering shaft for supporting the second rotary member, an end of the vehicle handle side steering shaft and an end of the vehicle wheel side steering shaft being abutted against each other and connected by a resilient member, being a torsion bar. The electrically driven power steering apparatus further comprises a motor used for providing assistance in turning a handle. In the apparatus, the rotation angle of the handle side steering shaft is detected by the first detecting element, and the rotation angle of the wheel side steering shaft is detected by the second detecting element, in order to detect the rotational torque on the first operating shaft from the difference between the rotation angle of the handle side steering shaft and the rotation angle of the wheel side steering shaft, whereby when the rotational torque exceeds a predetermined value, the motor starts to operate to provide assistance in turning the handle.

DESCRIPTION OF THE PREFERRED EMBODIMENT

A description will now be given of a rotation angle sensor of the present invention with reference to FIGS. 1 to 11. As shown in FIGS. 3A and 3B, which are external views of the rotation angle sensor of the present invention, the rotation angle sensor is formed by molding such that its inside is hollow. A substantially D-shaped housing 10 forms the outer portion of the rotation angle sensor.

A plate-shaped cover 11, which has the same external form as the housing 10, is placed onto the top portion of the housing 10. It is affixed to the housing 10 with a plurality of screws 12, whereby the top portion of the housing 10 is covered by the cover 1.

Figure 2:
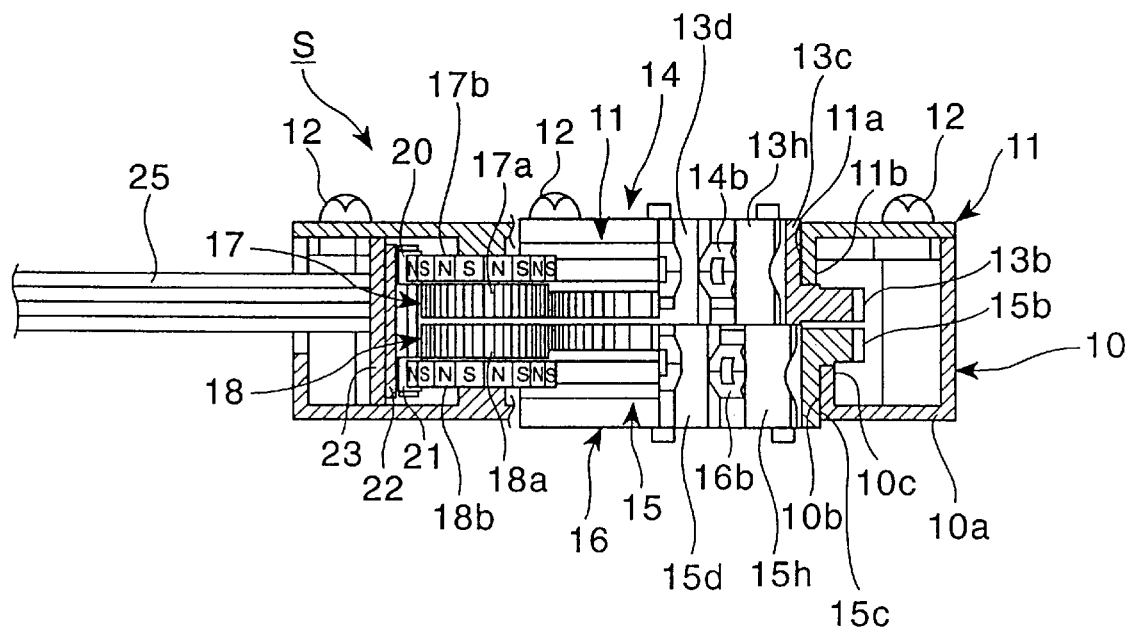
FIG. 2 is a sectional side view of the main portion of the rotation angle sensor in accordance with the present invention.
Figure 3A:
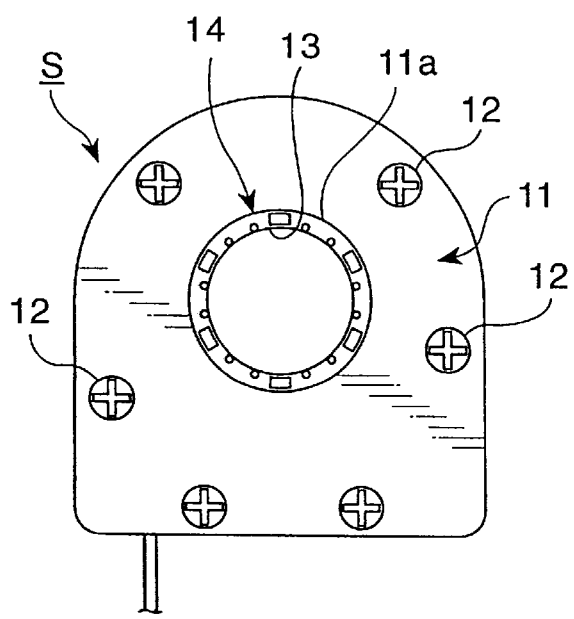
FIGS. 3A and 3B are external views of the rotation angle sensor in accordance with the present invention.
Figure 3B:
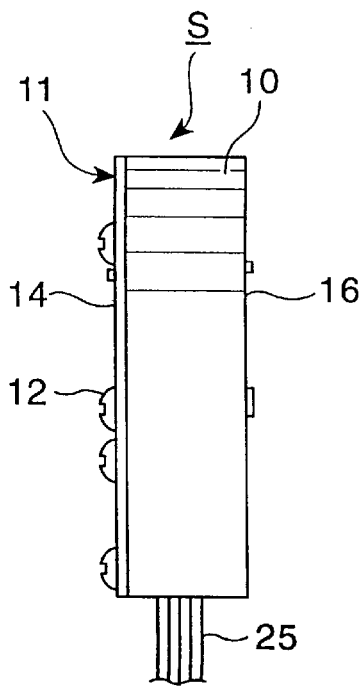

As shown in FIG. 2, a circular opening 10b is formed in substantially the center portion of a bottom wall 10a of the housing 10. A circular guide wall 10c is formed along the circumference of the opening 10b so as to protrude upwardly by a predetermined height.

Similarly, a circular opening 11a is formed in substantially the center portion of the cover 11. As shown in FIG. 2, a guide wall 11b is formed along the circumference of the opening 11a so as to protrude downwardly by a predetermined height.

A first rotary member 13 is inserted into the opening 11a of the cover 11, and is made of, for example, a molding material. FIG. 5 is a sectional side view of the main portion of the first rotary member 13. The first rotary member 13 has a flange 13a, shown at the bottom side of FIG. 5, and a gear portion 13b, with a predetermined number of teeth and modules, shown in FIG. 4 that is a top view of the first rotary member 13.

The first rotary member 13 has a bearing 13c formed above the flange 13a. The bearing 13c is formed to a predetermined height and has a substantially flange-like external form.

Figure 4:
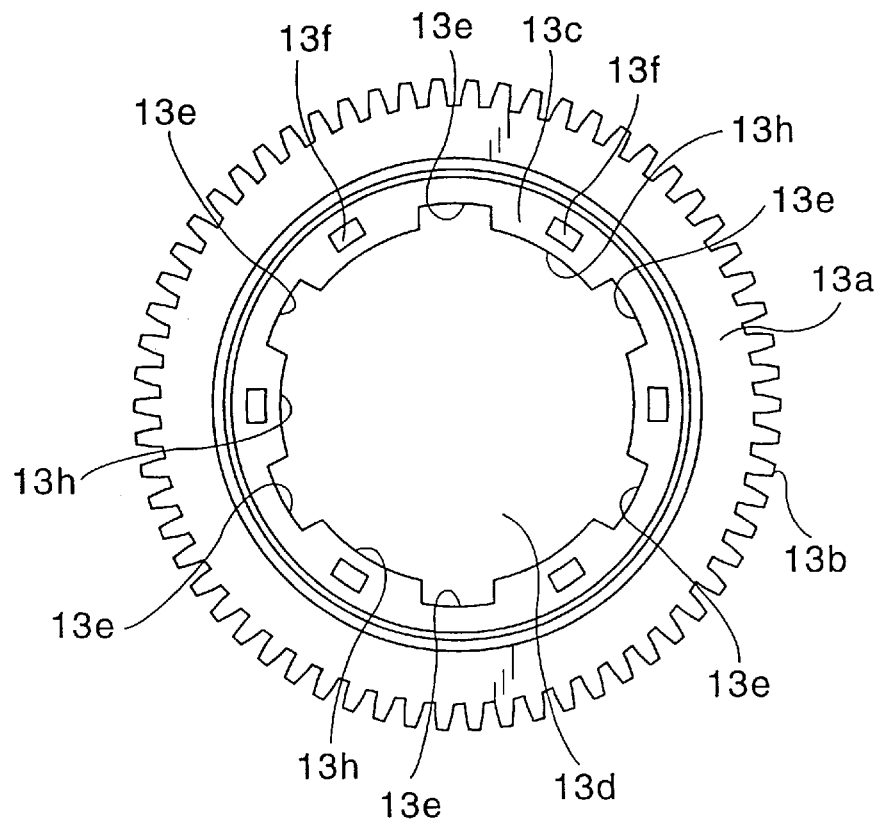
FIG. 4 is a plan view of a first rotary member of the rotation angle sensor in accordance with the present invention.
Figure 5:
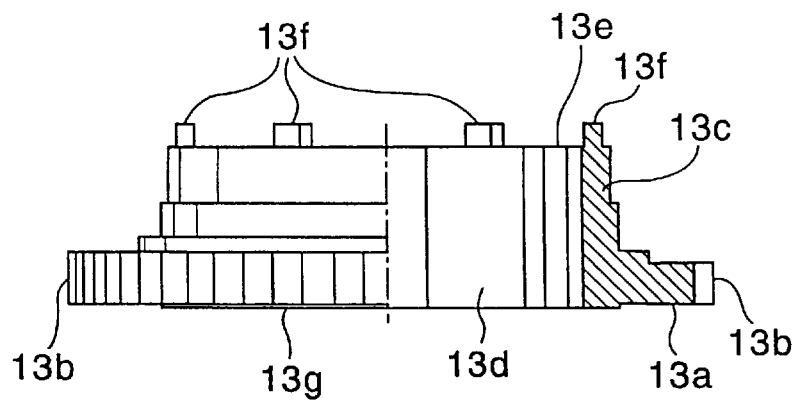
FIG. 5 is a sectional side view of the main portion of the first rotary member of the rotation angle sensor in accordance with the present invention.

As shown in FIG. 4, a circular, shaft-inserting hole 13d is formed in the first rotary member 13, at the center of rotation thereof, and a plurality of grooves 13e, formed to a predetermined depth and width, are formed in an inner peripheral surface 13h of the edge of the shaft-inserting hole 13d, in the axial direction thereof. A plurality of rectangular protrusions 13f are formed on the top surface of the bearing 13c so as to protrude a predetermined height from the top surface of the bearing 13c.

An annular protrusion 13g is formed along the circumference of a portion, below the flange 13a of FIG. 5, of the shaft-inserting hole 13d, so as to protrude by a small height.

The bearing 13c of the first rotary member 13 is inserted into the opening 11a of the cover 11, and is guided along the guide wall 11b, formed along the circumference of the opening 11a, such that it can rotate freely.

Figure 6:
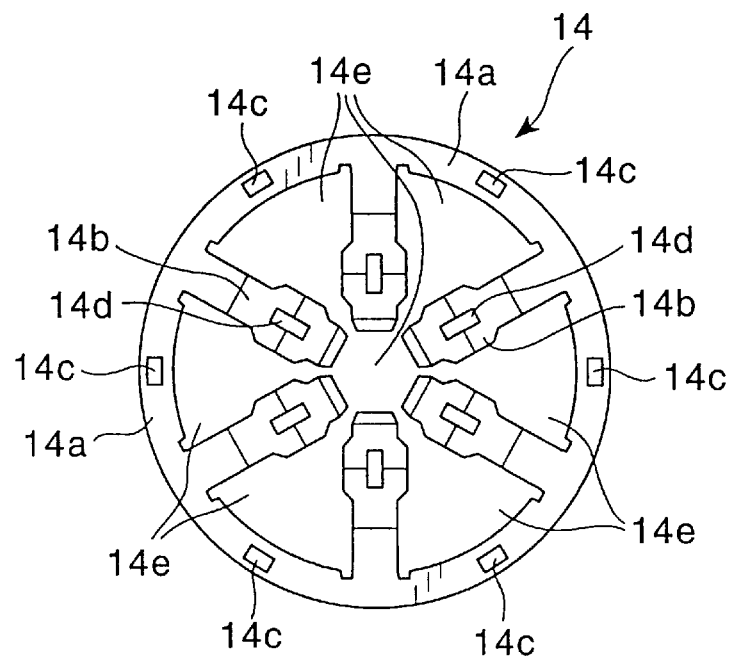
FIG. 6 is a plan view of the portions of a spring member, in the process of being formed, of the rotation angle sensor in accordance with the present invention.
Figure 7:
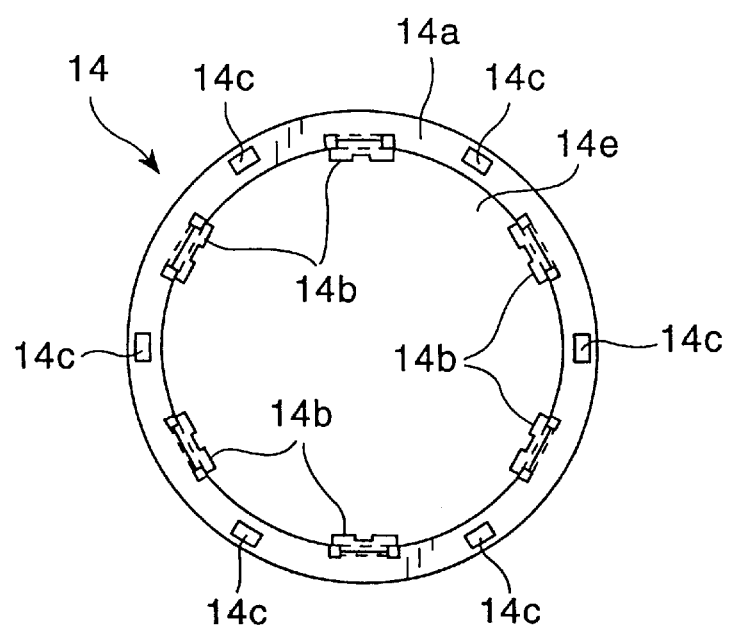
FIG. 7 is a plan view of the spring member of the rotation angle sensor in accordance with the present invention.
Figure 8:
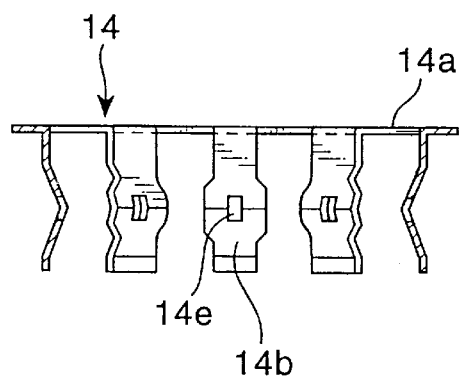
FIG. 8 is a side view of the spring member of the rotation angle sensor in accordance with the present invention.

A first engaging spring 14, such as that shown in FIGS. 6, 7, and 8, whose external shape is annular, is mounted to the top surface of the bearing 13c of the first rotary member 13. The first engaging spring 14 is formed of, for example, a springy stainless steel. As shown in FIG. 6, it has an annular frame portion 14a, formed at the outer periphery of the first engaging spring 14, and a plurality of spring portions 14b, which extend from the frame portion 14a into an opening 14e of the first engaging spring 14. The annular frame portion 14a and the spring portions 14b are formed by punching out, for example, stainless steel, by, for example, a pressing operation.

A plurality of square holes 14c are formed in the frame portion 14a by punching out a portion of the frame portion 14a, and a square hole 14d is formed towards an end of each spring portion 14b by punching out a portion of the end of each spring portion 14d. Each spring portion 14b is formed such that its top portion, which is substantially cone shaped, includes its associated square hole 14d.

As shown in FIG. 8, which is a sectional side view of the base portion of some of the spring portions 14b, the first engaging spring 14 is bent downward. As shown in FIG. 7, which is a top view of the first engaging spring 14, the first engaging spring 14 has a substantially circular opening 14e.

As shown in FIG. 2, the square holes 14c of the frame portion 14a are inserted onto the protrusions 13f, formed on the top surface of the bearing 13c of the first rotary member 13, and the ends of the protrusions 13f protruding above their respective square holes 14c are, for example, caulked by heating, whereby the first rotary member 13 and the first engaging spring 14 are integrally formed.

The downwardly bent spring portions 14b are positioned in the grooves 13e of the first rotary member 13. The substantially cone-shaped top portion, including its associated square hole 14d, of each spring portion 14b protrudes from the inner peripheral surface 13h of the edge of the shaft-inserting hole 13d into the shaft-inserting hole 13d of the first rotary member 13.

At the lower side of FIG. 2 that opposes the first rotary member 13 is disposed a second rotary member 15 having substantially the same form as the first rotary member 13. It comprises, for example, a gear portion 15b, a bearing portion 15c, and a shaft-inserting hole 15d, formed at an inner peripheral surface 15h of the second rotary member 15.

A second engaging spring 16, which has substantially the same form as the first engaging spring 14 and comprises a spring portion 16b, etc., is mounted to the second rotary member 15 by using the same method as that used for mounting the first engaging spring 14 to the first rotary member 13.

In other words, the first and second engaging springs 14 and 16, serving as spring members, are disposed at the inner peripheral surfaces 13h and 15h of the edges of the shaft-inserting holes 13d and 15d of the first rotary member 13 and the second rotary member 15, respectively.

The bearing portion 15c of the second rotary member 15 is inserted into the opening 10b of the housing 10, and is guided along the guide wall 10c, formed along the circumference of the opening 10b, so that it can rotate freely.

The first rotary member 13 and the second rotary member 15, mounted to the cover 11 and the housing 10, have the same center of rotation and can rotate separately.

Figure 1:
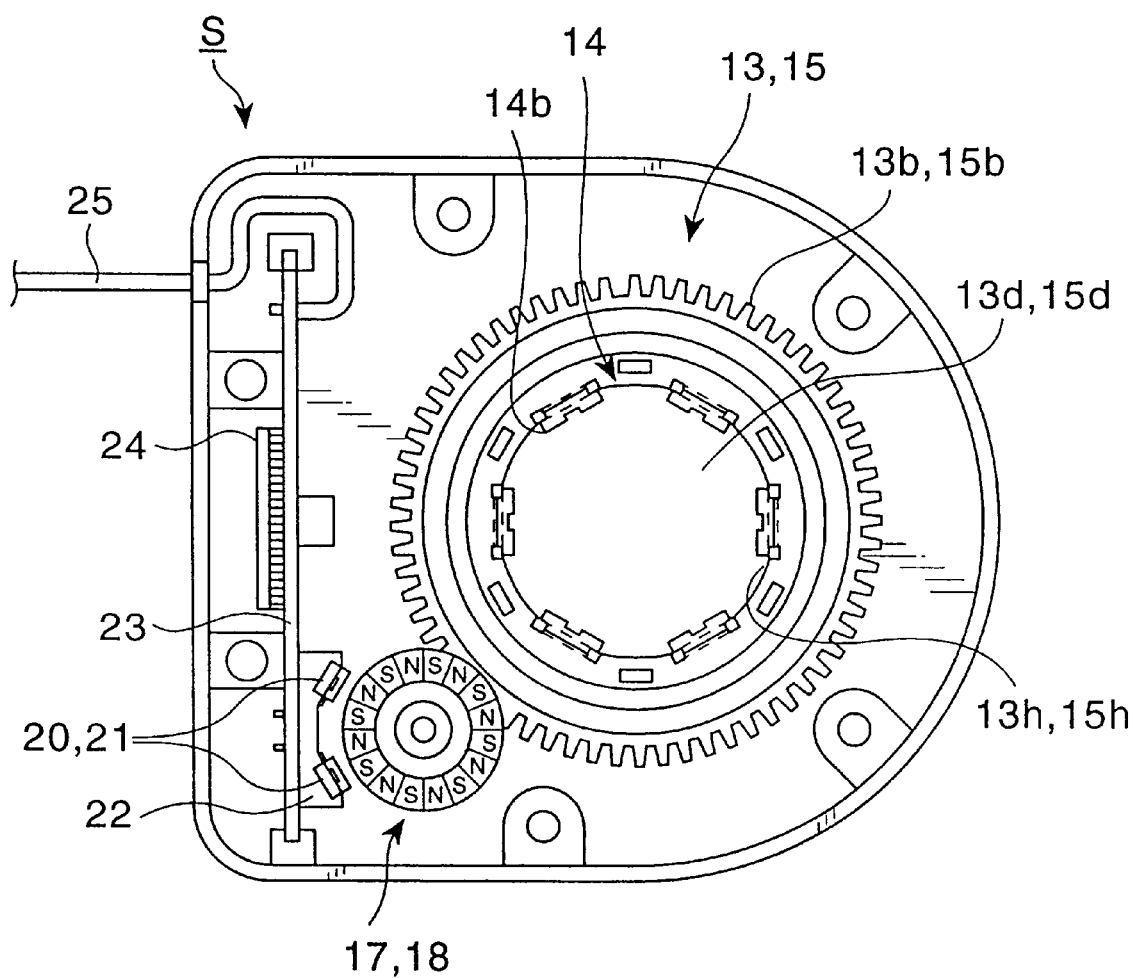
FIG. 1 is a plan view of a rotation angle sensor in accordance with the present invention, without a cover.

At the lower left side of the housing 10 of FIG. 1 are disposed a first code plate 17, which engages the gear portion 13b of the first rotary member 13, and a second code plate 18, which engages the gear portion 15b of the second rotary member 15.

Figure 9A:
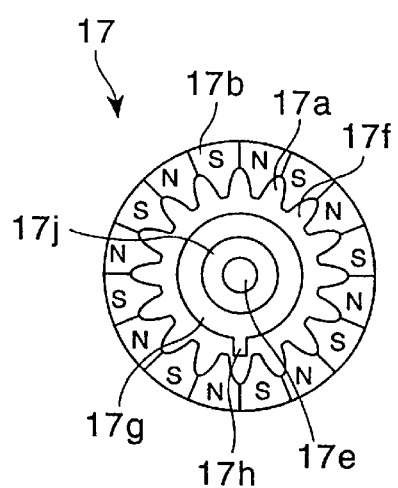
FIGS. 9A, 9B, and 9C are a top view, a sectional side view, and a bottom view of a code plate of the angle sensor in accordance with the present invention.
Figure 9B:
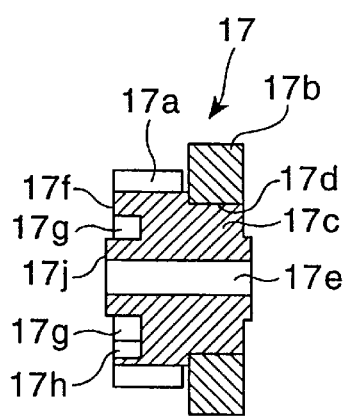
Figure 9C:
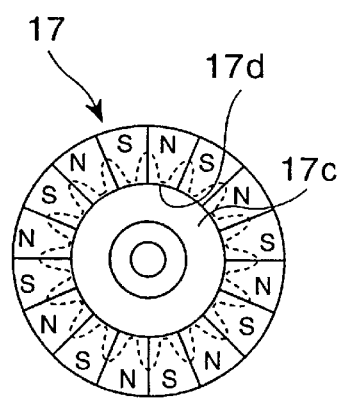

As shown in FIG. 9, the first code plate 17 comprises a gear portion 17a and an information recording portion 17b. The gear portion 17a engages the gear portion 13b of the first rotary member 13 and is made of, for example, resinous material. The information recording portion 17b is mounted to a side of the gear portion 17a and is made of a magnetic material with a plurality of magnetic north-south (N-S) poles.

The information recording portion 17b is formed into the shape of a disk with an outside diameter which is greater than the outside diameter of the gear portion 17a. A protruding boss portion 17c is formed at a side of the gear portion 17a.

The boss portion 17c, formed at a side of the gear portion 17a, is press-fitted or bonded to a boss hole 17d in the information recording portion 17b, whereby the gear portion 17a and the information recording portion 17b are integrally formed together.

A shaft-inserting hole 17e is formed through the first code plate 17, at the center of rotation of the first code plate 17. At a side surface 17f of the gear portion 17a are formed a spring groove 17g, having a predetermined depth, and a groove 17h for stopping rotation of a torsion coil spring (not shown) which is inserted into the spring groove 17g.

A protrusion 17j, which protrudes slightly from the side surface 17f, is formed at the inner peripheral side of the edge of the spring groove 17g.

As shown in FIG. 2, a second code plate 18, with the same form as the first code plate 17, is disposed at the lower side in FIG. 2 which opposes the gear portion 17a of the first code plate 17.

The second code plate 18 comprises a gear portion 18a, which engages the gear portion 15b of the second rotary member 15, an information recording portion 18b, a shaft-inserting hole (not shown), a protrusion (not shown), etc. A metallic supporting shaft is inserted into the shaft-inserting hole 17e of the first code plate 17 and the shaft-inserting hole (not shown) of the second code plate 18, and one side of the gear portion 17a and one side of the gear portion 18a are brought into contact with each other, in order to allow the code plates 17 and 18 to rotate separately.

The supporting shaft has its top end affixed to the cover 11 side and its bottom end affixed to the housing 10 side in order to accommodate the first code plate 17 and the second code plate 18 in the housing 10.

The spring groove 17g has inserted therein a torsion coil spring (not shown), which prevents backlash from occurring at the two code plates 17 and 18.

A holder 22 is disposed at the left lower corner of the housing 10 of FIG. 1. To the holder 22 are mounted first detecting elements 20 and second detecting elements 21, being, for example, hole elements, for detecting information, that is magnetic information, written on the information recording portions 17b and 18b of the code plates 17 and 18, respectively.

The portion of the holder 22 to which the detecting elements 20 and 21 are mounted has two nonparallel sides that incline towards each other. Two first detecting elements 20 are mounted to one of the nonparallel sides of the holder 22, while two second detecting elements 21 are mounted to the other nonparallel side of the holder 22, whereby they are mounted separately and vertically to the holder 22. The first detecting elements 20 are mounted at a location opposing the information recording portion 17b of the first code plate 17, while the second detecting elements 21 are mounted at a location opposing the information recording portion 18b of the second code plate 18.

The holder 22, to which the first detecting elements 20 and the second detecting elements 21 are mounted, has a flat back surface, which is, for example, bonded to a substrate 23 behind the back surface.

An integrated circuit (IC) 24, which is used to perform computations on the information sent from the detecting elements 20 and 21, is mounted to the insulating substrate 23, and a lead wire 25, for transmitting the information processed by the IC 24 to an external device, is mounted to the insulating substrate 23, by soldering or the like.

A description will now be given of the case where the rotation angle sensor of the present invention is used to form a torque sensor and is applied to an automobile steering shaft.

Figure 10:
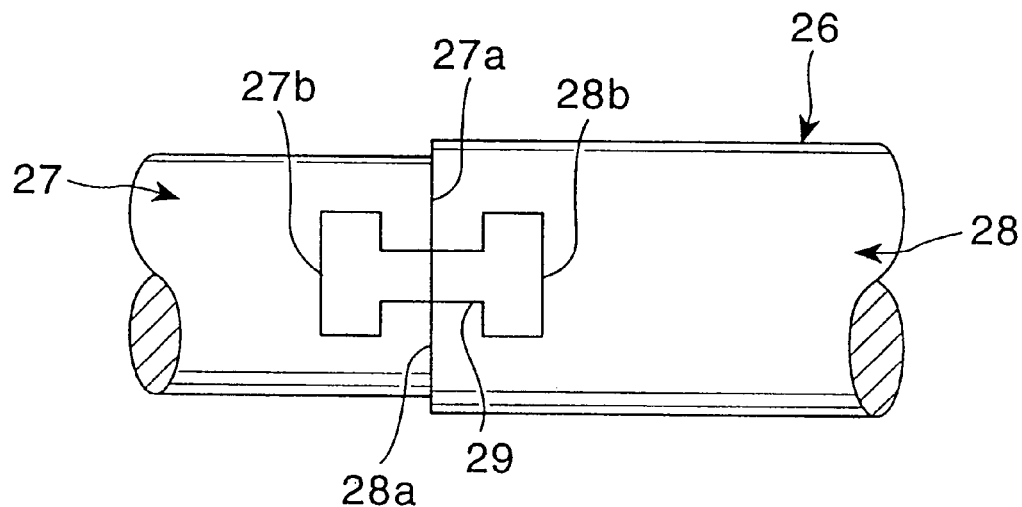
FIG. 10 is a side view of the main portion of the steering shaft to which the rotation angle sensor of the present invention is mounted.

As shown in FIG. 10, the automobile steering shaft 26 comprises, for example, a first operating shaft portion 27 and a second operating shaft portion 28, with T-shaped grooves 27b and 28b being formed in ends 27a and 28a, respectively. These ends 27a and 28a are abutted against each other. A resilient member 29, shown in black in FIG. 10, is inserted into the grooves 27b and 28b, whereby the first operating shaft portion 27 and the second operating shaft portion 28 are connected together. The resilient member 29 is, for example, a torsion bar.

The first rotary member 13 of a rotation angle sensor S of the present invention is inserted into the end 27a of the first operating portion shaft portion 27, and the second rotary member of the rotation angle sensor S is inserted into the end 28a of the second operating shaft portion 28.

As described above, the spring portions 14b and 16b of the first and second engaging springs 14 and 16, being spring members, are disposed at the inner peripheral surfaces 13h and 15h of the edges of the shaft-inserting holes 13d and 15d of their respective first rotary member 13 and the second rotary member 15. The spring portions 14b and 16b resiliently press against the first operating shaft portion 27 and the second operating shaft portion 28, respectively, in order for the first rotary member 13 and the second rotary member 15 to be supported by the first operating shaft portion 27 and the second operating shaft portion 28, respectively, whereby the rotation angle sensor S is mounted to the steering shaft 26.

Figure 11:
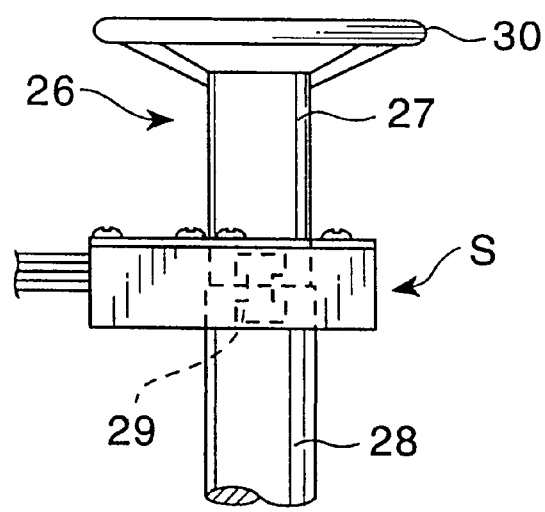
FIG. 11 is a schematic view of the rotation angle sensor of the present invention mounted to the steering shaft.
Figure 12:
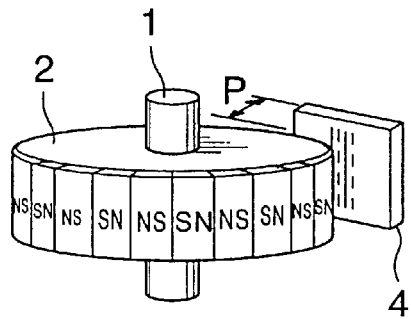
FIG. 12 is a schematic view of a conventional rotation angle sensor.
Figure 13:
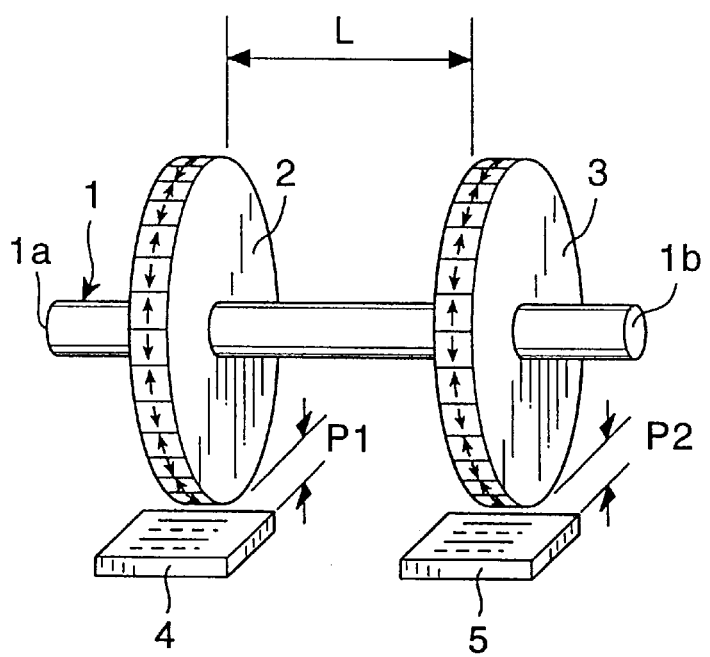
FIG. 13 is a schematic view of a torque sensor formed by mounting two conventional rotation angle sensors to the rotary shaft.

As shown in FIG. 11, the steering shaft 26 is constructed such that a handle 30 is mounted to the first operating shaft portion 27, and the second operating shaft portion 28 is mounted to a wheel (not shown). When the handle 30 is turned to rotate the second operating shaft portion 28, the rotational torque on the second operating shaft portion 28 becomes large due to, for example, the condition of the road surface (not shown) with which the vehicle wheels are in contact. In this case, when the first operating shaft portion 27 is rotated as a result of turning the handle 30, the second operating shaft portion 28, due to the resilient member 29, is rotated later than the first operating shaft portion 27, causing the rotation angles of the first operating shaft portion 27 and the second operation shaft portion 28 to differ.

This difference in rotation angles causes the rotation angles of the first code plate 17 and the second code plate 18 to differ. The rotation angle of the first code plate 17 and the rotation angle of the second code plate 18 are detected by the first detecting element 20 and the second detecting element 21, respectively. The difference in the rotation angles of the code plates 17 and 18 are computed by means of the IC 24, thereby allowing the rotational torque at the first operating shaft portion 27 side to be detected. Accordingly, the rotation angle sensor S of the present invention can be used to form a torque sensor.

The electrically driven power steering apparatus of the present invention comprises an electric motor (not shown), such as a motor which assists the operator in operating the handle 30. When the handle 30 is turned, the torque sensor detects the rotational torque on the first operating shaft portion 27. When the rotational torque on the first operating shaft portion 27 exceeds a predetermined value, an operation command is sent forth from the IC 24 towards the electric motor, through a driver, thereby actuating the electric motor.

The actuating force of the electric motor is used to assist the operator, who is turning the handle 30 with a certain turning force, in turning the handle 30, whereby less rotational torque is exerted on the handle 30.

Although in the foregoing description of the rotation angle sensor S of the present invention the information recording portions 17b and 18b of the code plates 17 and 18 were described as magnetic media, and the detecting elements 20 and 21 were described as magnetic sensors, the information recording portions 17b and 18b may be identification marks identifiable by, for example, an optical sensor, and the detecting elements may be, for example, optical sensors consisting of a light emitter and a light receiver.

According to the rotation angle sensor of the present invention, when the code plates are rotated as a result of turning the rotary members, the detecting elements detect information on their associated code plates in order to detect the rotation angles of their associated rotary members. Therefore, the code plates and the rotary members can be formed as separate members. Even when the rotary members are slightly displaced as a result of undue load on the rotary members, the undue load is not exerted onto the code plates, so that the amount of gap between the code plates and their associated detecting elements does not change.

Consequently, it is possible to provide a rotation angle sensor which can detect the angle of rotation of a rotary member precisely, even when an undue load is exerted onto the rotary member.

In addition, the rotation angle sensor comprises first and second rotary members which can rotate separately and which have the same center of rotation; first and second code plates which have gear portions that engage their respective rotary members and which can rotate separately; and first and second detecting elements for detecting information on their associated first code plate and second code plate. When the first rotary member and the second rotary member are rotated by engaging the gear portion of the first code plate with the gear portion of the first rotary member, and by engaging the gear portion of the second code plate with the gear portion of the second rotary member, the information on the first code plate is detected by the first detecting element, and the information on the second code plate is detected by the second detecting element, so that the rotation angles of the first rotary member and the second rotary member can be separately detected. Therefore, the code plates and the rotary members can be formed as separate component parts through the gear portions, so that even when an undue load is exerted onto the rotary members, it is possible to support the code plates without backlash. The rotation angle sensor can be used for a torque sensor which can detect the rotational torque on the first rotary member and the second rotary member, from the difference between the rotation angles of the two rotary members detected by their associated two code plates.

Further, according to the rotation angle sensor, the first and second code plates have the same center of rotation, with the gear portions being disposed such that one side of one of the gear portions and one side of the other of the gear portions oppose each other. The information recording portions are formed on the other sides, not facing each other, of the gear portions, such that their outside diameters are larger than the outside diameters of their respective gear portions. The first and second rotary members are rotatably interposed between the information recording portions. By virtue of such a structure, the outside dimensions of the information recording portions of the code plates can be made large, thereby allowing the rotation angles to be detected with high precision.

Still further, since the rotary members are interposed between the information recording portions, the outside dimensions of the rotation angle sensor do not become large, even when the outside dimensions of the information recording portions are large.

Still further, the rotary members, the code plates, and the detecting elements are accommodated in a box-shaped housing such that the detecting elements are disposed at a corner of the housing, and the code plates are disposed between the detecting elements and their associated rotary members. Therefore, the outside dimensions of the rotation angle sensor can be made small.

Still further, the code plates each have an information recording portion made of magnetic material with a plurality of magnetic poles, and the detecting elements are magnetic sensors which react to the magnetic field of the magnetic material. Therefore, when the magnetic field is varied as a result of rotating the code plates, the magnetic field variation can be detected by the detecting elements with high precision. Consequently, it is possible to provide a rotation angle sensor which can detect the rotation angle of a rotary member with high precision.

Still further, since the magnetic members around the shaft-inserting holes of the rotary members do not have to be formed to large diameters, the rotation angle sensor can be formed to the minimum size required. Therefore, a cheap rotation angle sensor can be provided.

The torque sensor of the present invention comprises a rotation angle sensor including a first rotary member and a second rotary member being separately rotatable and having the same center of rotation, each having a gear portion at the outer peripheral portion thereof and a shaft-inserting hole at the center of rotation thereof. In addition, the rotation angle sensor includes a first code plate and a second code plate being separately rotatable, the first code plate having a gear portion which engages the first rotary member and the second code plate having a gear portion which engages the second rotary member, the first code plate having an information recording portion which rotates in response to the rotation of the first rotary member and the second code plate having an information recording portion which rotates in response to the rotation of the second rotary member. Further, the rotation angle sensor includes a first detecting element for detecting information written on the first information recording portion, and a second detecting element for detecting information written on the second information recording portion. In the rotation angle sensor, when the first rotary member and the second rotary member rotate to rotate the first code plate and the second code plate, respectively, the first detecting element detects the information on the first code plate and the second detecting element detects the information on the second code plate, whereby the rotation angle of the first rotary member and the rotation angle of the second rotary member are detected. The torque sensor also comprises a first operating shaft and a second operating shaft, an end of the first operating shaft and an end of the second operating shaft being abutted against each other and connected by a resilient member, being a torsion bar. In the torque sensor, the first rotary member is supported by the end of the first operating shaft, and the second rotary member is supported by the end of the second operating shaft, in order to detect the rotation angle of the first operating shaft by the first detecting element and the rotation angle of the second operating shaft by the second detecting element, whereby the rotational torque on the first operating shaft is detected from the difference between the rotation angle of the first operating shaft and the rotation angle of the second operating shaft. By virtue of this structure, the rotation angle sensor can detect with high precision the difference between the rotation angle of the first operating shaft and the rotation angle of the second operating shaft. An IC performs computations on the difference of the rotation angles in order to convert it to a torque value, whereby the rotational torque on the first operating shaft can be detected with high precision.

In the torque sensor, a spring member is provided at the inner peripheral surface of the edge of the shaft-inserting hole of the first rotary member and at the inner peripheral surface of the edge of the shaft-inserting hole of the second rotary member, the spring members resiliently pressing against the first and the second operating shafts in order to support the first rotary member by the first operating shaft and the second rotary member by the second operating shaft. Therefore, the rotary members can be supported by their respective operating shafts, while the spring members resiliently press against the operating shafts, by merely fitting the rotary members into their respective operating shafts.

Consequently, it is possible to provide a torque sensor which allows the rotary members to be easily mounted to the operating shafts, without slippage of the rotary members with respect to the operating shafts.

The electrically driven power steering apparatus comprises a rotation angle sensor including a first rotary member and a second rotary member being separately rotatable and having the same center of rotation, each having a gear portion at the outer peripheral portion thereof and a shaft-inserting hole at the center of rotation thereof. In addition, the rotation angle sensor includes a first code plate and a second code plate being separately rotatable, the first code plate having a gear portion which engages the first rotary member and the second code plate having a gear portion which engages the second rotary member, the first code plate having an information recording portion which rotates in response to the rotation of the first rotary member and the second code plate having an information recording portion which rotates in response to the rotation of the second rotary member. Further, the rotation angle sensor includes a first detecting element for detecting information written on the first information recording portion, and a second detecting element for detecting information written on the second information recording portion. In the rotation angle sensor, when the first code plate and the second code plate are rotated as a result of rotation of the first rotary member and the second rotary member, respectively, the first detecting element detects the information on the first code plate and the second detecting element detects the information on the second code plate, whereby the rotation angle of the first rotary member and the rotation angle of the second rotary member are detected. The electrically driven power steering apparatus also comprises a vehicle handle side steering shaft for supporting the first rotary shaft, and a vehicle wheel side steering shaft for supporting the second rotary member, an end of the vehicle handle side steering shaft and an end of the vehicle wheel side steering shaft being abutted against each other and connected by a resilient member, being a torsion bar. The apparatus further comprises a motor used for giving assistance in turning a handle. In the apparatus, the rotation angle of the handle side steering shaft is detected by the first detecting element, and the rotation angle of the wheel side steering shaft is detected by the second detecting element, in order to detect the rotational torque on the first operating shaft from the difference between the rotation angle of the handle side steering shaft and the rotation angle of the wheel side steering shaft, whereby when the rotational torque exceeds a predetermined value, the motor starts to operate for giving assistance in turning the handle. By virtue of this structure, it is possible to provide an electrically driven power steering apparatus which can detect the rotational torque on an operating shaft with high precision and which can provide high performance utilizing the rotational torque detected with high precision.

What is claimed is:

1. A rotation angle sensor, comprising:
    a rotary member having a gear portion at the outer peripheral portion thereof, said rotary member having a shaft-inserting hole at the center of rotation thereof;
    a code plate that is rotatable in response to rotation of said rotary member, the code plate comprising:
        a code plate gear portion which engages said gear portion of said rotary member, said code plate gear portion having a substantially circular cross section of a first diameter; and
        a code plate information recording portion coupled with the code plate gear portion, the code plate information recording portion having a substantially circular cross section of a second diameter that is greater than the first diameter; and
    a detecting element disposed opposite said code plate for detecting information written on said code plate information recording portion;
    wherein when said code plate rotates as a result of rotation of said rotary member, said detecting element detects the information on said code plate in order to detect the rotation angle of said rotary member.

2. A rotation angle sensor according to claim 1, wherein said rotary member comprises a first rotary member portion and a second rotary member portion, said first rotary member portion and said second rotary member portion being separately rotatable and having the same center of rotation; wherein said code plate comprises a first code plate portion and a second code plate portion, each code plate portion having a gear portion which engages said rotary member, having a code plate information recording portion, and being separately rotatable; and wherein said detecting element comprises a first detecting element portion and a second detecting element portion for detecting information on said code plate information recording portion of said first code plate portion and said second code plate portion, respectively; and wherein when said first rotary member portion and said second rotary member portion are rotated by engaging said gear portion of said first code plate portion with a gear portion of said first rotary member portion, and by engaging said gear portion of said second code plate portion with a gear portion of said second rotary member portion, the information on said first code plate portion is detected by said first detecting element portion and, the information on said second code plate portion is detected by said second detecting element portion, whereby the rotation angle of said first rotary member portion and the rotation angle of said second rotary member portion are separately detected.

3. A rotation angle sensor according to claim 2, wherein said first code plate portion and said second code plate portion have the same center of rotation, one side of said gear portion of said first code plate portion and one side of said gear portion of said second code plate portion being disposed such that they face each other, and the other side of said gear portion of said first code plate portion having thereat said code plate information recording portion associated thereto and the other side of said gear portion of said second code plate portion having formed thereat said code plate information recording portion associated thereto, and wherein said first rotary member portion and said second rotary member portion are rotatably interposed between said code plate information recording portions.

4. A rotation angle sensor according to claim 1, wherein said rotary member, said code plate, and said detecting element are accommodated in a box-shaped housing, and wherein said code plate is disposed between said detecting element and said rotary member.

5. A rotation angle sensor according to claim 1, wherein said code plate information recording portion of said code plate is composed of magnetic material with a plurality of magnetic poles, and wherein said detecting element comprises a magnetic sensor which reacts with the magnetic field of the magnetic material.

6. A torque sensor, comprising:

a rotation angle sensor including a first rotary member and a second rotary member being separately rotatable and having the same center of rotation, each having a gear portion at the outer peripheral portion thereof and a shaft-inserting hole at the center of rotation thereof;

wherein said rotation angle sensor further includes a first code plate and a second code plate being separately rotatable, said first code plate having a gear portion which engages said first rotary member and said second code plate having a gear portion which engages said second rotary member, said first code plate having an information recording portion which rotates in response to the rotation of said first rotary member and said second code plate having an information recording portion which rotates in response to the rotation of said second rotary member; and a first detecting element disposed opposite the first code plate for detecting information written on said first information recording portion, and a second detecting element disposed opposite the second code plate for detecting information written on said second information recording portion;

wherein when said first rotary member and said second rotary member rotate to rotate said first code plate and said second code plate, respectively, said first detecting element detects the information on said first code plate and said second detecting element detects the information on said second code plate, whereby the rotation angle of said first rotary member and the rotation angle of said second rotary member are detected; and wherein said torque sensor further comprises a first operating shaft and a second operating shaft, an end of said first operating shaft and an end of said second operating shaft being abutted against each other and connected by a resilient member, being a torsion bar;

wherein said first rotary member is supported by the end of said first operating shaft, and said second rotary member is supported by the end of said second operating shaft, in order to detect the rotation angle of said first operating shaft by said first detecting element and the rotation angle of said second operating shaft by said second detecting element, whereby the rotational torque on said first operating shaft is detected from the difference between the rotation angle of said first operating shaft and the rotation angle of said second operating shaft.

7. A torque sensor according to claim 6, wherein a spring member is provided at the inner peripheral surface of the edge of said shaft-inserting hole of said first rotary member and at the inner peripheral surface of the edge of said shaft-inserting hole of said second rotary member, said spring members resiliently pressing against said first and said second operating shafts in order to support said first rotary member by said first operating shaft and said second rotary member by said second operating shaft.

* * * * *